United States Patent

[11] 3,625,830

[72] Inventors Malcolm E. Bergy
 Kalamazoo;
 Fritz Reusser, Portage, both of Mich.
[21] Appl. No. 30,255
[22] Filed Apr. 20, 1970
[45] Patented Dec. 7, 1971
[73] Assignee The Upjohn Company
 Kalamazoo, Mich.

[54] CULTIVATING STREPTOMYCES DESDANUS VAR. DESDANUS TO PRODUCE DESDANINE
 3 Claims, No Drawings
[52] U.S. Cl....................................................... 195/80,
 424/123

[51] Int. Cl. ........................................................ C12d 9/00
[50] Field of Search ............................................ 195/80

[56] References Cited
 UNITED STATES PATENTS
 3,364,115  1/1968  Mason et al. ................. 195/80 X Primary Examiner—Joseph M. Golian
Attorneys—Roman Saliwanchik and John Kekich

ABSTRACT: Microbiological process for preparing the antibiotic desdanine which does not require the addition of an $\omega$-alkylthio-$\alpha$-amino acid to the fermentation medium. Desdanine can be used for preventing rot and spoilage of shell eggs caused by *Proteus vulgaris*.

the## CULTIVATING STREPTOMYCES DESDANUS VAR. DESDANUS TO PRODUCE DESDANINE

BRIEF SUMMARY OF THE INVENTION

Desdanine is a useful antibiotic produced by a fermentation process using the micro-organism *Streptomyces caelestis*, NRRL 2418, wherein an ω-alkylthio-α-amino acid is incorporated in the fermentation medium. The production of desdanine by such a process, as well as the recovery and characterization of desdanine is described in U.S. Pat. No. 3,364,115. Desdanine, as described therein, has the formula $C_7H_{10}NO$; it is a basic antibiotic having a molecular weight of 138; and it is optically inactive.

The microbiological process of the subject invention comprises the use of a novel micro-organism which can produce desdanine in a fermentation medium to which *no* ω-alkylthio-α-amino acid has been added. Thus, the subject process eliminates an essential step of the prior art process to prepare desdanine.

DETAILED DESCRIPTION

Upon cultivating the novel micro-organism of the subject invention in a fermentation medium, without the addition of an ω-alkylthio-α-amino acid, there is obtained the antibiotic desdanine.

Preferably, desdanine is produced when the new micro-organism is grown in an aqueous nutrient medium under submerged aerobic conditions. It is to be understood also that for the preparation of limited amounts surface cultures and bottles can be employed. The organism is grown in a nutrient medium containing a carbon source, for example, an assimilable carbohydrate, and a nitrogen source, for example, an assimilable nitrogen compound or proteinaceous material. Preferred carbon sources include glucose, brown sugar, sucrose, glycerol, starch, cornstarch, lactose, dextrin, molasses, and the like. Preferred nitrogen sources include corn steep liquor, yeast, autolyzed brewer's yeast with milk solids, soybean meal, cottonseed meal, cornmeal, milk solids, pancreatic digest of casein, distillers' solids, animal peptone liquors, meat and bone scraps, and the like. Combinations of these carbon and nitrogen sources can be used advantageously. Trace metals, for example, zinc, magnesium, manganese, cobalt, iron, and the like, need not be added to the fermentation media since tap water and unpurified ingredients are used as media components.

Production of the compound of the invention can be effected at any temperature conducive to satisfactory growth of the micro-organism, for example, between about 18° and 40° C., and preferably between about 20° and 32° C. Ordinarily, optimum production of the compound is obtained in about 2 to 10 days. The medium normally remains basic during the fermentation. The final pH is dependent, in part, on the buffers present, if any, and, in part, on the initial pH of the culture medium.

When growth is carried out in large vessels and tanks, it is preferable to use the vegetative form, rather than the spore form, of the micro-organism for inoculation to avoid a pronounced lag in the production of the new compound and the attendant inefficient utilization of the equipment. Accordingly, it is desirable to produce a vegetative inoculum in a nutrient broth culture by inoculating this broth culture with an aliquot from a soil or a slant culture. When a young, active, vegetative inoculum has thus been secured, it is transfered aseptically to large vessels or tanks. The medium in which the vegetative inoculum is produced can be the same as, or different from, that utilized for the production of the new compound, as long as it is such that good growth of the micro-organism is obtained.

THE MICRO-ORGANISM

The actinomycete used according to this invention for the production of desdanine is *Streptomyces desdanus* var. *desdanus*. One of its strain characteristics is the production of desdanine in a fermentation medium in which no ω-alkylthio-α-amino acid is incorporated. A subculture of the living organism was deposited without restriction and can be obtained from the permanent collection of the Northern Utilization and Research Division, Agricultural Research Service, U.S. Department of Agriculture, Peoria, Ill., U.S.A. Its accession number in this repository is NRRL 3814.

The micro-organism of this invention was studied and characterized by Alma Dietz of The Upjohn Research Laboratories.

DESCRIPTION OF THE MICRO-ORGANISM

*Streptomyces desdanus* Dietz, sp. n. (*S. desdanus* var. *desdanus*)

Color characteristics. White to cream to cream pink aerial mycelium. Melanin negative. Yellow reverse on most media. Appearance on Ektachrome is given in table 1. Reference color characteristics on agar media are given in table 2. The culture may be placed in the Yellow (Y) and Gray (GY) color series of Tresner and Backus [Appl. Microbiol. 11:335–338 (1963)]

Microscopic characteristics. Straight sporophores (RF) in the sense of Pridham et al. [Appl. Microbiol. 6:52–79 (1958)] bearing small spores (50 or more per chain) by light-microscope examination. Spores smooth by direct electron-microscope examination. Spores treated by the carbon-replica technique of Dietz and Mathews [Appl. Microbiol. 10:258–263 (1962)] show surface ridging when examined with the electron-microscope.

Cultural and biochemical characteristics. See table 3.

Carbon Utilization. Growth of the culture on carbon compounds was determined by using the synthetic medium of Pridham and Gottlieb [J. Bacteriol. 56:107–114 (1948)] and their modified medium as cited in Shirling and Gottlieb [International Journal of Systemic Bacteriology 16:313–340 (1966)]. In the former, culture growth was good on d-xylose, L-arabinose, D-fructose, D-galactose, D-glucose, D-mannose, maltose, sucrose, lactose, cellobiose, raffinose, dextrin, inulin, soluble starch, glycerol, salicin, Na acetate, Na citrate, Na succinate; moderate on the control, rhamnose, dulcitol, D-mannitol, D-sorbitol, inositol, Na formate, Na oxalate, Na tartrate; slight on phenol. There was no growth on cresol or sodium salicylate. In the latter there was slight growth on the plain (negative) control and good growth on the glucose (positive) control. There was strongly positive utilization of L-arabinose, sucrose, D-xylose, D-fructose, raffinose; positive utilization of rhamnose; and doubtful utilization of inositol, D-mannitol, and cellulose.

Temperature. Good growth with sporulation occurred at 28°–37 C. There was no aerial growth at 18° C., trace aerial growth at 24° C., and no growth at 45° or 55° C.

Antibiotic producing properties. The culture produces the antibiotic desdanine.

Source. Soil

DISCUSSION

*Streptomyces desdanus*, a new species of *Streptomyces* isolated from soil, produces the antibiotic desdanine. The antibiotic was produced previously, only when methionine, S-methyl cysteine, or S-ethyl cysteine were added to the fermentation medium of the celesticetin-producing culture, *Streptomyces caelestis*. *S. caelestis* is distinctly different from *S. desdanus* in its color characteristics, microscopic characteristics, and general cultural characteristics. A brief comparison of the cultures is given in table 4.

The new soil isolate could not be equated with species of actinomycetes in The Upjohn Collection or in the literature descriptions in Gauze [State Publishing House for Medical Literature, Moscow (1957); English edition translated by F. Danga, The American Institute for Biological Sciences, Washington, D.C.], Hutter [Systematik der Streptomyceten unter besonderer Berucksichtigung der von ihnen gebildeten Antibiotica. S. Karger, Basel (Schweiz), New York (1967)], Krassilnikov [Academy of Sciences, U.S.S.R., Moscow (1949), English edition translated by J. B. Routien, Chas. Pfizer & Co., Inc. (1957)], or Waksman [The Actinomycetes, Vol. 2 (1961)].

The distinctive cultural characteristics of the Upjohn soil isolate, one of which is its ability to produce the antibiotic desdanine, give validity to the specification of this new soil isolate as a new species of *Streptomyces*. In conformity with the rules of the International Code of Nomenclature of Bacteria [International Journal of Bacteriol. 16:459–490 (1966)] the organism is named and designated as a new species, *Streptomyces desdanus* sp. n. It is proposed that this organism, maintained in The Upjohn Collection as UC 5324, be designated the type strain, *Streptomyces desdanus* var. *desdanus*.

The characteristics of *Streptomyces desdanus* Dietz, sp. n., NRRL 3814, are given in the following tables:

TABLE 1

Appearance of *Streptomyces desdanus* on Ektachrome [1]

| Agar medium | Surface | Reverse |
|---|---|---|
| Bennett's | Cream-white | Bright yellow. |
| Czapek's sucrose | do | Do. |
| Maltose-tryptone | Fair cream-white | Do. |
| Peptone-iron | No aerial growth | Do. |
| 0.1% tyrosine | Trace cream-white | Do. |
| Case in-starch | No aerial growth to trace cream-white. | Pale yellow. |

[1] Dietz, A., "Ektachrome Transparencies as Aids in Actinomycete Classification," Annals of the New York Academy of Sciences, 60:152–154, 1954.

TABLE 2

Reference Color Characteristics of *Streptomyces desdanus*

| Agar medium | | Color Harmony Manual 3rd ed., 1948 [1] | ISCC-NBS Method of Designating Colors and a Dictionary of Color Names, 1955 [2] |
|---|---|---|---|
| Bennett's | | | |
| | S | 2ca light ivory, eggshell / 1ba yellow tint | 89gm pale yellow. / 92m yellowish-white. |
| | R | 2ie squash yellow, maize | 121gm pale yellow green. / 87gm moderate yellow. |
| | P | 1½ie light olive / 1ie dusty olive, light moss green | 106gm light olive. / Do. |
| Czapek's sucrose | | | |
| | S | 2ca light ivory, eggshell / 1ba yellow tint | 89gm pale yellow. / 92m yellowish-white. |
| | R | 2ic squash yellow, maize / 2ie mustard, old gold | 87gm moderate yellow. / 88gm dark yellow. / 94g light olive brown. / 106gm light olive. |
| | P | 1½ie light olive / 2ie light mustard tan | 91gm dark yellowish gray. / 94g light olive brown. / 106g light olive. |
| Maltose-tryptone | | | |
| | S | 2dc natural, string / 3dc natural / 5ba shell pink | 93gm yellowish gray. / 9m pinkish white. |
| | R | 2ge covert tan, griege | 94m light olive brown. / 109gm light grayish olive. |
| | P | 3ie camel, maple sugar, tan / 1½ge light olive gray | 76m light yellowish brown. / 77g moderate yellowish brown. / 109gm light grayish olive. |
| Yeast extract-malt extract (ISP-2) | | | |
| | S | 2ca light ivory, eggshell | 89gm pale yellow. |
| | R | 3ie light amber | 71m moderate orange yellow. / 72g dark orange yellow. |
| | P | 1½ie light olive / 1ie dusty olive, light moss green | 106gm light olive. / Do. |
| Oatmeal (ISP-3) | | | |
| | S | 3ba pearl, shell tint | |
| | R | 1½gc dusty yellow | 102g moderate greenish yellow. / 105gm grayish greenish yellow. |
| | P | 1ie dusty olive light moss green | 106gm light olive. |
| Inorganic-salts starch (ISP-4) | | | |
| | S | 3ba pearl, shell tint | |
| | R | 3gc light tan | 76gm light yellowish brown. |
| | P | 2cc biscuit, ecru, oatmeal, sand | 90gm grayish yellow. |
| Glycerol-asparagine (ISP-5) | | | |
| | S | 2ca light ivory, eggshell | 89gm pale yellow. |
| | R | 3ie cinnamon, yellow-maple | 74g strong yellowish brown. / 76m light yellowish brown. |
| | P | 1ie dusty olive, light moss green | 106gm light olive. |

NOTE.—S=Surface; R=Reverse (all readings from glossy surface of chips); P=Pigment.
[1] Jacobson, E., W. C. Granville, and C. E. Foss. 1948. Color Harmony Manual, 3rd ed. Container Corporation of America, Chicago, Ill.
[2] Kelly, K. L., and D. B. Judd. 1955. The ISCC-NBS Method of Designating Colors and a Dictionary of Color Names. U.S. Dept. of Comm. Circ. 553.

TABLE 3

Cultural and Biochemical Characteristics of *Streptomyces desdanus*

| Medium | Surface | Reverse | Other |
|---|---|---|---|
| Agar: | | | |
| Peptone-iron | Trace white | Yellow | Melanin-negative. |
| Calcium malate | White | Cream-white to pale yellow. | No pigment. / Malate not solubilized. |
| Glucose-asparagine | No aerial growth | Pale yellow | Pale yellow pigment. |
| Skim milk | Very slight trace white | Yellow | Yellow pigment. / Casein solubilized. |
| Tyrosine | White-feathery on edge | do | Yellow pigment. / Tyrosine solubilized. |
| Xanthine | White-feathery | do | Yellow pigment. / Xanthine solubilized. |
| Nutrient starch | White-feathery on edge | do | Trace yellow pigment. / Starch hydrolyzed. |
| Yeast extract-malt extract | Pale tan-rugose with feathered edge | Deep yellow | Yellow pigment. |
| Bennett's | Cream | Yellow | Yellow. |
| Czapek's sucrose | Cream-tan | do | Do. |
| Maltose-tryptone | Cream-pink | Cream-yellow | Pale yellow. |
| Peptone-yeast extract (ISP-6) | No aerial growth | Yellow | Yellow pigment. / Melanin-negative. |
| Tyrosine (ISP-7) | Cream | do | Yellow pigment. |

TABLE 3—Continued
Cultural and Biochemical Characteristics of *Streptomyces desdanus*

| Medium | Surface | Reverse | Other |
|---|---|---|---|
| Gelatin: | | | |
| Plain | | | Yellow pigment. Gelatin liquefaction ¼-⅓. |
| Nutrient | | | Yellow pigment. Gelatin liquefaction ¼-complete. |
| Broth: | | | |
| Synthetic | Flecked, yellow surface growth | | None to pale yellow to yellow pigment. Heavy flecked bottom growth. Nitrate not reduced to nitrate. |
| Nutrient | White aerial on surface growth | | Yellow pigment. Poor bottom growth. Nitrate not reduced to nitrite. |
| Litmus milk | Blue surface ring | | Blue pigment. Peptonization. pH 7.8–8.0. |

TABLE 4
Comparison of *Streptomyces desdanus* and *Streptomyces caelestis*

| Agar medium | | S. desdanus | S. caelestis |
|---|---|---|---|
| Peptone-iron: | | | |
| | S | Trace white | No aerial growth. |
| | R | Yellow | Brown. |
| | O | Melanin-negative | Melan in-positive. |
| Calcium malate: | | | |
| | S | White | Trace white. |
| | R | Cream white to pale yellow | White. |
| | O | No pigment. Malate not solubilized | No pigment. Malate solubilized. |
| Skim milk: | | | |
| | S | Very slight trace white | No aerial growth. |
| | R | Yellow | Tan brown. |
| | O | Yellow pigment. Casein solubilized | No pigment. Casein not solubilized. |
| Tyrosine: | | | |
| | S | White-feathery on edge | Blue-gray. |
| | R | Yellow | Brown. |
| | O | Yellow pigment. Tyrosine solubilized | Light brown pigment. Tyrosine solubilized. |
| Temperature | | Grows at 18–37° C. (poor at 45° C. on Czapek's sucrose). No growth at 55° C | Grows at 18–45° C. (poor at 45° C.). Fair vegetative growth in 48 hours at 55° C. |
| Sporophore type | | Straight | Straight to open spiral to spiral. |

NOTE.—S = Surface; R = Reverse; O = Other characteristics.

Desdanine can be isolated from fermentation medium by the procedures disclosed in U.S. Pat. No. 3,364,115. For example, extraction techniques with water-immiscible solvents can be employed. Suitable such solvents are methylene chloride, 1-butanol, lower alkyl alkanoates such as ethyl acetate, butyl, acetate, and amyl acetate, and ketones such as isopropyl butyl ketone. Also, desdanine can be recovered from fermentation medium by adsorption techniques, for example, adsorption on cationic exchange resins and elution therefrom. Cationic exchange resins which can be used include both carboxylic acid resins (exemplified by Amberlite IRC–50 and Zeocarb 226) and sulfonic acid resins (exemplified by Dowex 50, Amberlite IR–120, Nalcite HCR, Chempro C–20, Permutit Q and Zeokarb 225). Further, desdanine can be recovered from fermentation medium by adsorption on activated carbon, or a resin which is a nonionic macroporous copolymer of styrene cross-linked with divinylbenzene (exemplified by Amberlite XAD–2 resin—Rohm & Haas Co.), and elution therefrom.

In a preferred recovery process, desdanine-containing fermentation broth is first filtered to remove mycelia and undissolved solids. Desdanine is then removed from the filtrate by passing the same through a column containing a resin which is a nonionic macroporous copolymer of styrene cross-linked with divinylbenzene. [This resin is prepared by suspension polymerization of styrene divinylbenzene copolymers in the presence of a substance which is a good solvent for the copolymer. See JACS 84, 306 (1962). Suitable resins are known by the trade names Amberlite XAD–1 and Amberlite XAD–2.]b The resin is eluted with a solvent system consisting of acetone-water (1:1). The eluate is concentrated to an aqueous solution, adjusted to a pH of about 6.5 with a mineral acid (hydrochloric acid preferred), and freeze-dried to give a crude preparation of desdanine.

Purification of the above-described crude preparation of desdanine can be accomplished by the procedures disclosed in U.S. Pat. No. 3,364,115. In a preferred purification process, a crude preparation of desdanine, as described above, is purified by silica gel column chromatography to relatively pure crystalline desdanine.

Desdanine is useful for inhibiting the micro-organism *Proteus vulgaris* in paper mill systems where this micro-organism is an odor producer. Also, it is useful in wash solutions for washing equipment, furnishings, walls and floors in dental and medical offices, and in hospitals for controlling the population of staphylococci.

The following examples are illustrative of the process of the present invention but are not to be construed as limiting.

EXAMPLE 1

Part A. Fermentation

A soil stock of *Streptomyces desdanus* var. *desdanus*, NRRL 3814, is used to inoculate a series of 500-ml. erlenmeyer flasks, each containing 100 ml. of sterile preseed medium consisting of the following ingredients:

| | |
|---|---|
| Glucose monohydrate | 25 g./liter |
| Pharmamedia* | 25 g./liter |
| Tap water q.s. | Balance |

*Pharmamedia is an industrial grade of cottonseed flour produced by Trader's Oil Mill Company, Fort Worth, Tex.

The medium is adjusted to pH 7.2 with aqueous NaOH before sterilization.

The flasks are grown for 3 days at 28° C. on a reciprocating shaker.

Preseed inoculum, described above, is used to inoculate a seed tank containing 20 liters of sterile medium consisting of the following ingredients:

| | |
|---|---|
| Glucose monohydrate | 10 g./liter |
| Cornsteep liquor | 10 g./liter |
| Pharmamedia | 2 g./liter |
| Wilson's Peptone Liquor No. 159* | 10 g./liter |
| Lard oil | ½% by volume |
| Tap water q.s. | Balance |

*Wilson's Peptone Liquor No. 159 is a preparation of hydrolyzed proteins of animal origin.

The medium is adjusted to pH 7.2 with aqueous sodium hydroxide before sterilization.

The seed tank is inoculated with 100 ml. of the preseed inoculum. The seed tank is incubated at 28° C. for 2 days with agitation at the rate of 400 r.p.m. and aeration at the rate of 10 standard liters/minute at 7 p.s.i. back pressure.

12.5 Liters of seed inoculum, described above, is used to inoculate a 400-liter fermentation tank containing 250 liters of sterile fermentation medium consisting of the following ingredients:

| | |
|---|---|
| Glucose monohydrate | 15 g./liter |
| Dextrin | 25 g./liter |
| Corn gluten meal | 20 g./liter |
| Oatmeal (Ralston Purina) | 15 g./liter |
| Tap water | Balance |

The medium is adjusted to pH 7.2 with aqueous NaOH before sterilization.

The fermentation medium is inoculated with 5 percent (volume/volume) of the seed inoculum, described above. The fermentation proceeds for 2–3 days during which time the fermentation medium is agitated at a rate of 320 r.p.m., and aeration provided at the rate of 250 standard liters/minute at 10 p.s.i. back pressure. The temperature in the fermentation tank is maintained at 28° C. When foaming occurs, sterile lard oil is used as antifoam.

A typical desdanine fermentation, as described above, can be illustrated by the following assay profile:

| Days | Assay (biounits/ml.) |
|---|---|
| 0 | — |
| 1 | 0 |
| 2 | 18.0 |
| 3 | 21.0 |
| 4 | 7.5 |

The assay is a disc plate assay using the micro-organism *Proteus vulgaris*. The assay is conducted at pH of 6.0. A standardized spore suspension pf *P. vulgaris* (0.5 ml.) is inoculated into 1 liter of melted BBL seed agar (30.5 g./liter), supplied by Baltimore Biological Laboratories. Agar plates are then poured, 0.08 ml. sample aliquots are pipetted onto ½-inch paper discs placed on the agar, and the plates are incubated overnight at 32° C.

One biounit (BU) is defined as that amount of the active material which gives a 20 mm. diameter zone of inhibition. One biounit equals about 52 $\mu$g. of desdanine. Alternatively, the zone size can be referred to a standard curve prepared with standard desdanine.

Part B. Recovery

Whole fermentation broth (8.7 liters assaying 500 $\mu$g./ml. against *P. vulgaris*), from a desdanine fermentation as described in Part A, is adjusted to pH 10.0 with sodium hydroxide and filtered with the aid of about 5 percent diatomaceous earth. The filter cake is washed with water (500 ml.), and the cake is discarded. The combined filtrate and cake wash (7.2 liters assaying 420 $\mu$g./ml. against *P. vulgaris*), is passed (flow rate 20 ml./min.) through a 6.4 cm. diameter column containing 720 ml. of Amberlite XAD–2 resin. The effluent is discarded. The resin is then eluted with 2 liters of acetone-water (1:1). The eluate is concentrated to an aqueous solution, adjusted to about pH 6.5 with hydrochloric acid, and freeze-dried; yield, 35 grams of a desdanine preparation assaying 15 $\mu$g./mg. against *P. vulgaris*.

Part C. Purification

Silica gel (1 Kg. No. 7734, Merck) is mixed with the solvent system methylene chloride-methanol (95:5) and packed into a 6 cm. (I.D.) glass chromatography column to a constant height of 80 cm. with flowing solvent system.

A preparation of desdanine (25 grams assaying 40 $\mu$g./mg. against *P. vulgaris*), prepared as described in Part B, is mixed with methanol (50 ml.) for 30 minutes and then mixed with 125 g. of silica gel No. 7734. The methanol is removed by evaporation and the dried silica gel-desdanine mixture is added to a small head of solvent system remaining on top of the silica gel column bed. The solvent level is drained to the level of the stating material, fresh solvent system is added, and the column is then washed with 8 liters of this solvent. The solvent system is then changed to methylene chloride-methanol (90:10) and the column is developed at a flow rate of 50 ml./min. Fractions (500 ml.) are collected and analyzed by U.V. at 232 m$\mu$ (methanol). Fractions 24 and 25 are combined and concentrated in vacuo to a volume of 50 ml., filtered, the concentrated further to an oil at which time desdanine crystallizes. The desdanine crystals are suspended in acetone (10 ml.), isolated by filtration, washed with acetone, and dried in vacuo to a constant weight; yield, 183 mg. of essentially pure crystalline desdanine.

We claim:

1. A process for preparing the antibiotic desdanine which comprises cultivating *Streptomyces desdanus* var. *desdanus* in an aqueous nutrient medium under aerobic conditions until substantial antibiotic activity is imparted to said medium by the production of desdanine.

2. A process according to claim 1 which comprises cultivating *Streptomyces desdanus* var. *desdanus* in an aqueous nutrient medium containing a source of assimilable carbohydrate and assimilable nitrogen under aerobic conditions until substantial antibiotic activity is imparted to said medium by the production of desdanine and isolating the desdanine so produced.

3. A process according to claim 2 in which the isolation comprises filtering the fermentation medium to obtain a filtrate containing desdanine, passing said filtrate through a column containing a resin which is like a nonionic macroporous copolymer of styrene cross-linked with devinylbenzene, eluting said resin with a solvent system consisting of acetone-water (1:1) to obtain an eluate containing desdanine, concentrating said eluate to an aqueous solution, adjusting the pH of said aqueous solution to about 6.5, and freeze-drying said aqueous solution to give a crude preparation of desdanine.

* * * * *

UNITED STATES PATENT OFFICE
CERTIFICATE OF CORRECTION

Patent No. 3,625,830          Dated December 7, 1971

Inventor(s) Malcolm E. Bergy and Fritz Reusser

It is certified that error appears in the above-identified patent and that said Letters Patent are hereby corrected as shown below:

Column 1, line 12, for "$C_7H_{10}NO$" read -- $C_7H_{10}N_2O$.
Column 2, line 52, for "28°-37 C." read -- 28-37°C. --.
Column 4, line 2, after "tables:" should read --

Table 1  Appearance of Streptomyces desdanus on Ektachrome
Table 2  Reference Color Characteristics of Streptomyces desdanus
Table 3  Cultural and Biochemical Characteristics of Streptomyces desdanus
Table 4  Comparison of Streptomyces desdanus and Streptomyces caelestis --.

Column 5, line 67, for "2.]b The" read -- 2.]  The --.
Column 6, line 10, Table 3, for "Nitrate not reduced to nitrate" read -- Nitrate not reduced to nitrite --. Column 8, line 24, for "stating" read -- starting --; line 31, for "the" read -- then --; line 53, for "which is like a" read -- which is a --.

Signed and sealed this 4th day of July 1972.

(SEAL)
Attest:

EDWARD M. FLETCHER, JR.          ROBERT GOTTSCHALK
Attesting Officer                Commissioner of Patents